United States Patent
Kozloski et al.

(10) Patent No.: US 10,115,107 B2
(45) Date of Patent: Oct. 30, 2018

(54) PAYMENT CARD FRAUD PROTECTION

(71) Applicant: International Business Machines Corporation, Armonk, NY (US)

(72) Inventors: James R. Kozloski, New Fairfield, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 14/138,737

(22) Filed: Dec. 23, 2013

(65) Prior Publication Data
US 2015/0178733 A1 Jun. 25, 2015

(51) Int. Cl.
G06Q 99/00 (2006.01)
G06Q 20/40 (2012.01)
G06Q 20/34 (2012.01)

(52) U.S. Cl.
CPC ......... *G06Q 20/4016* (2013.01); *G06Q 20/34* (2013.01)

(58) Field of Classification Search
CPC .................. G06Q 20/4016; G06Q 20/34
See application file for complete search history.

(56) References Cited

U.S. PATENT DOCUMENTS

| | | | |
|---|---|---|---|
| 7,707,089 B1 * | 4/2010 | Barton | G06Q 20/10 235/380 |
| 7,857,212 B1 | 12/2010 | Matthews | |
| 8,229,853 B2 | 7/2012 | Dispensa et al. | |
| 2002/0138438 A1 * | 9/2002 | Bardwell | G06F 21/32 705/51 |
| 2002/0148892 A1 * | 10/2002 | Bardwell | G06F 21/32 235/380 |
| 2002/0196963 A1 * | 12/2002 | Bardwell | G06F 21/32 382/124 |
| 2003/0110130 A1 * | 6/2003 | Pelletier | G06Q 30/02 705/50 |
| 2003/0126006 A1 * | 7/2003 | Kumar | G06Q 40/00 705/35 |
| 2004/0177046 A1 | 9/2004 | Ogram | |
| 2005/0038701 A1 * | 2/2005 | Matthew | G06Q 20/105 705/14.38 |

(Continued)

OTHER PUBLICATIONS

Diebold Inc., "Battling Card Fraud through Chip and PIN Technology," White Paper, 2011, 6 pages. File No. 98-178, Copyright Diebold Incorporated, North Canton, Ohio 44720-8077.

(Continued)

*Primary Examiner* — Rajesh Khattar
(74) *Attorney, Agent, or Firm* — Fleit Gibbons Gutman Bongini Bianco PL; Jon A. Gibbons

(57) ABSTRACT

Disclosed is a novel system and method for managing payment card fraud. More particularly, accessing information associated with at least one card holder after the card holder has physically passed through at least one security checkpoint in which the card holder's identity has been authenticated. Next at least one payment card identifier associated with the card holder is received. A payment card profile associated with the payment card is updated. In one example, information from a ticket is also used with the payment card identifier to manage the probability of rejection. Numerous embodiments are disclosed.

17 Claims, 10 Drawing Sheets

(56) References Cited

U.S. PATENT DOCUMENTS

| | | | |
|---|---|---|---|
| 2007/0055672 A1* | 3/2007 | Stevens | G06F 17/3087 |
| 2007/0057039 A1 | 3/2007 | Carlson et al. | |
| 2007/0106606 A1 | 5/2007 | Pankratz et al. | |
| 2007/0192249 A1* | 8/2007 | Biffle | G06Q 10/02 |
| | | | 705/44 |
| 2009/0271302 A1* | 10/2009 | Hamper | G06Q 10/10 |
| | | | 705/30 |
| 2009/0327088 A1* | 12/2009 | Puthupparambil | G06Q 20/20 |
| | | | 705/21 |
| 2011/0112954 A1 | 5/2011 | Bruesewitz et al. | |
| 2012/0132706 A1 | 5/2012 | McKenzie | |
| 2012/0150686 A1 | 6/2012 | Aldomar et al. | |
| 2012/0317016 A1* | 12/2012 | Hughes | G06Q 40/025 |
| | | | 705/38 |
| 2012/0323777 A1* | 12/2012 | Liberty | G06Q 20/223 |
| | | | 705/41 |
| 2013/0166332 A1* | 6/2013 | Hammad | G07B 13/00 |
| | | | 705/5 |
| 2013/0311369 A1* | 11/2013 | Elrod | G06Q 20/4016 |
| | | | 705/44 |

OTHER PUBLICATIONS

Masuda, B., "Credit card fraud prevention: A successful retail strategy," Crime prevention studies, 1993, pp. 121-134. vol. 1.

\* cited by examiner

| PAYMENT CARD IDENTIFIER 702 | USER/TRAVELER 704 | DESTINATION REGION 706 | TIME PERIOD 708 | PROBABILITY 710 | ... |
|---|---|---|---|---|---|
| CARD 1 | TRAVELER A | CITY M | 48 HOURS | H | ... |
| CARD 2 | TRAVELER B | CITY M | 48 HOURS | H | ... |
| ... | ... | ... | ... | ... | ... |
| CARD 1 | TRAVELER B | COUNTRY C | 7 DAYS | H | ... |
| CARD 2 | TRAVELER B | COUNTRY C | 7 DAYS | H | ... |
| CARD 3 | TRAVELER B | COUNTRY C | 7 DAYS | H | ... |
| ... | ... | ... | ... | ... | ... |
| CARD 1 | TRAVELER C | VENUE | 4 HOURS | H | ... |
| ... | ... | ... | ... | ... | ... |
| CARD 1 | TRAVELER D | CITY - PORT OF CALL | 8 HOURS | H | ... |
| CARD 2 | TRAVELER D | CITY - PORT OF CALL | 8 HOURS | H | ... |
| CARD 3 | TRAVELER D | N/A | N/A | L | ... |
| ... | ... | ... | ... | ... | ... |

FIG. 7

PAYMENT CARD FRAUD PROTECTION

BACKGROUND

The present invention generally relates to managing payment cards, and more specifically to managing payment cards for card holders traveling to different geographic regions.

The use of payment cards has grown significantly in recent time. Payment cards are broadly defined to include credit cards, cash cards, pre-paid cards, secured cards, gift cards, automatic teller cards, bank cards, check cards, and any other type of non-cash payment. Along with this growth of payment cards, people are traveling more than ever. Domestic and international travel continues to increase year after year.

The confluence of these two trends, use of payment cards and increase travel makes it difficult for providers of payment cards to identify fraudulent transactions. In fact it is not usual for a card holder who uses payment cards, to have transactions denied because they arrive at a destination geography which is outside a region set by the provider of the payment card. It can be embarrassing, stressful, and frustrating for a card holder to have payment card denied for a financial transaction. Accordingly, a need exist to manage payment cards, especially for card holders that travel.

SUMMARY

Disclosed is a novel payment card fraud manger method and system. The payment card fraud manager assists with managing credit card transactions. The method begins with accessing information associated with a card holder or traveler after the card holder has physically passed through at least one security checkpoint in which the card holder's identify had been authenticated. The security checkpoint may be registered as an accepted checkpoint with a vendor service, or the checkpoint may be of a category that is recognized and accepted by a service. The security check point may be an aviation security checkpoint, a bus security checkpoint, a train security checkpoint, a ship security checkpoint, a stadium security checkpoint, a border crossing security checkpoint, or a combination thereof. The security checkpoint is any physical checkpoint in which the card holder is inspected and identification authenticated.

Security checkpoints require travelers to show identification in order to proceed. Therefore after the traveler/card holder has passed through the security checkpoint there is a high probability that card holder's identify has been authenticated. Photo identification and/or biometric identification is commonly used for authentication at security checkpoints. Common photo identification includes a passport, a driver's license, and a government issued identification card. Biometric identification includes retina scans and finger prints. After the security checkpoint, a payment card fraud manager system receives at least one payment card identifier associated with a card holder. The payment card information may be received using a swiped of a magnetic payment card in a card reader, a text message from the card holder, an optical recognition of a picture of a payment card taken by a smartphone of the card holder, a near field wireless communication of a smart-chip, or a combination thereof. For example, a card holder on an airline may swipe their card into a card reader on the plane. The information is transferred to the payment card fraud management system. The payment card profile associated with the payment card is updated. The payment card profile may be updated with a destination region or a time period or a combination of both. For example, a card holder going to a destination region may have their payment card profile updated for a period of time that corresponds to a date and time for a return ticket or for a time period corresponding to a specific event, e.g. a sporting event or concert. The updated payment card profile reduces the probability of rejection when the payment card is used to make a purchase in a destination region. For enhanced payment card fraud processing, the payment card fraud management system may use information from a ticket associated with the card holder, such as time, destination, return date, and more. Also, the telecommunication network associated with the ticket may be verified. For example, after a card holder goes through a security checkpoint to get on a cruise ship, the card holder uses a smartphone to take a picture of their credit cards. Picture processing including optical character recognition performed locally or in the cloud, to determine an identifier for the cards. The system also determines the destination of the cruise and the time to return from information associated with the ticket. Lastly, because the network address of the information is coming from the cruise ship or from the card holder's own telephone number, this increases the probability that the card holder is indeed on the cruise ship after passing through the security checkpoint.

In another example, advertisement is sent to the device of the card holder after sending payment card identifiers to the payment card fraud management system. The advertisements can be targeted for the destination, the duration, the user, and other factors.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 7 is an example a payment card profile.

DETAILED DESCRIPTION

Figure 1:
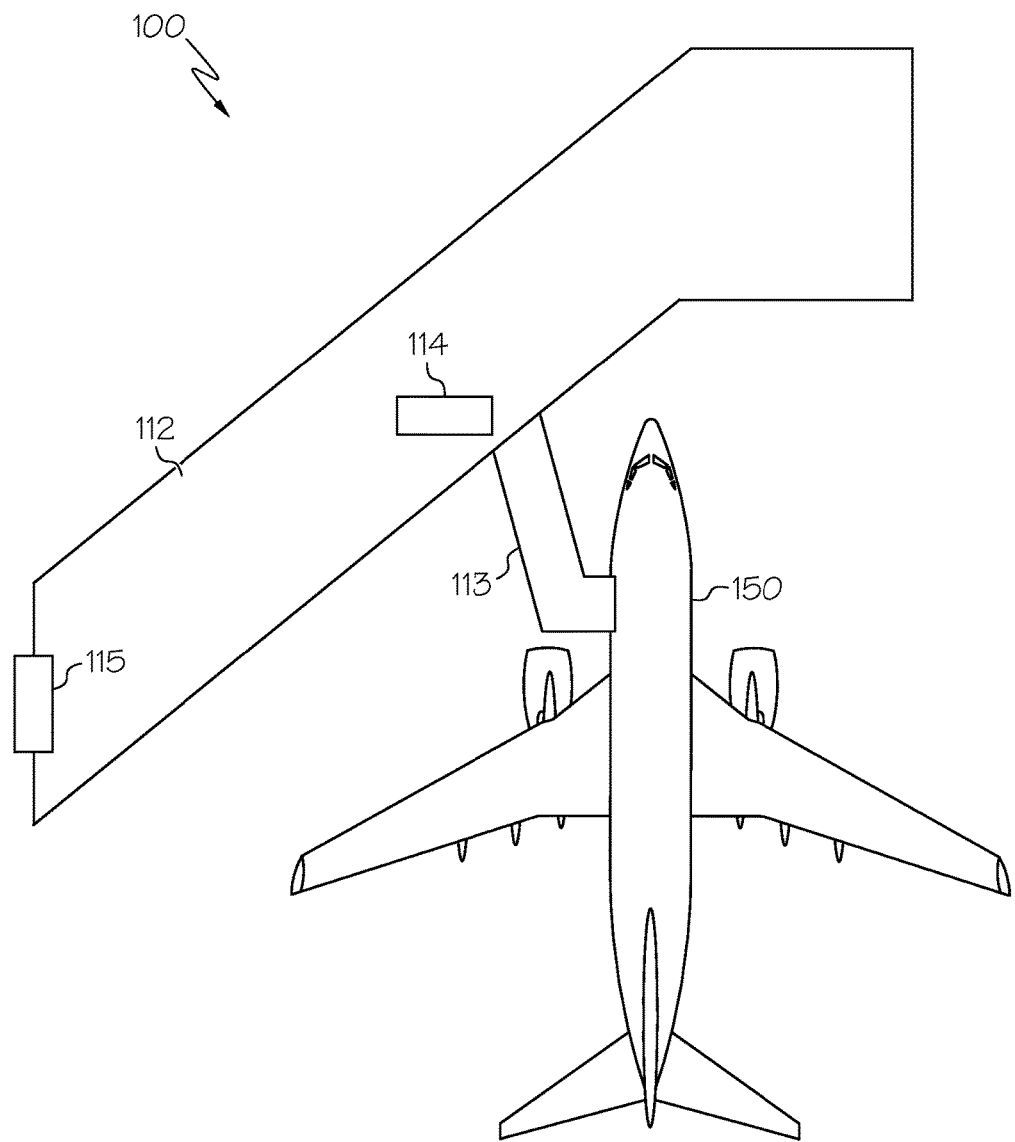
FIG. 1 is a typical security checkpoint for an airline.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The claimed invention decreases the traditional hassles of payment card being denied at a remote location as a result of a credit-card company considering the card likely to be stolen because the destination city or country is not generally visited by the payment card holder and is not considered to be part of a known pattern of card use. It does so, in part, by leveraging existing identification and security measures in place due to security checkpoints for travel.

Non-Limiting Definitions

The terminology used herein is for the purpose of describing particular embodiments only and is not intended to be limiting of the invention. As used herein, the singular forms "a", "an" and "the" are intended to include the plural forms as well, unless the context clearly indicates otherwise.

The term "authenticated" means confirming a user of a card holder has successfully physically pass-through security checkpoints after the user's identification has been authenticated. The authentication can be a requirement for travel on a public or private transportation network, attending an event at a stadium, or entering a country.

The term "authorization of payment card" means allowing a non-cash credit transaction for a given payment card.

The term "client device" is any device, such as a computer, laptop, smartphone, tablet, television, or other information processing device in which software and data can be processed.

The terms "comprises" and/or "comprising," specify the presence of stated features, steps, operations, elements, and/or components, but do not preclude the presence or addition of one or more other features, integers, steps, operations, elements, components, and/or groups thereof.

The term "destination region" means a defined portion of the world. A destination region could be any pre-defined geographic region including a country, a state, a postal code, a stadium, or an area defined by global position system (GPS) coordinates, in which payment card is authorized for use.

The term "card holder" or "traveler" or "spectator" is a person using a ticket to see a show or participated in an event or travel on a vehicle.

The term "payment card" is a card issued to a user as a system of payment. It includes credit cards, cash cards, pre-paid cards, secured cards, gift cards, automatic teller cards, bank cards, check cards, and any other type of non-cash payment.

The term "payment card identifier" means accessing a unique identifier associated with a payment card. Accessing the payment card identifier can be via a payment card reader, text message, optical recognition of a picture of a payment card, near field wireless communication, or a combination thereof.

The term "payment card profile" means a customizable configuration value to manage acceptable geographic regions, time periods, or a combination thereof of the payment card.

The term "security checkpoint" means a physical checkpoint where card holders are inspected and authenticated.

The term "ticket" means a physical piece of paper, or electronic record, such as an e-ticket, that allows a card holder or card holder to see a show or participated in an event, travel on a vehicle, etc.

The term "ticket collector" means a person, gate keeper, agent or system used verify a ticket to see a show or participated in an event, or travel on a vehicle.

The term "time period" means a duration, such as those measured in minutes, in which a payment card is authorized for use.

The term "ticket venue network address" means an identifier for a node, network interface of a telecommunications network, such as an IP address or MAC address or host of a plane, train, cruise ship or stadium for which the ticket is used.

Security Checkpoint

Referring to FIG. 1, shown is a typical security checkpoint 100 for an airline 150. In order to pass through a security checkpoint, travelers must show an identification, typically photo identification, or biometric scans, in order to be authenticated. Once the traveler's identify has been authenticated, the traveler physically passes through security portal 115 to enter gate area 112. The security portal 115 may include X-ray machines and metal detectors and other systems to protect passengers, staff and aircraft from accidental and malicious crimes ant threats. Many times in the US, these security portals 115 are managed by the Transportation Security Administration (TSA). Once inside the gate area 112, passengers wait for the boarding of the aircraft 150. When boarding is called, passengers present their ticket to a ticket collector in order to board the aircraft 150 via portal 113.

Figure 2:
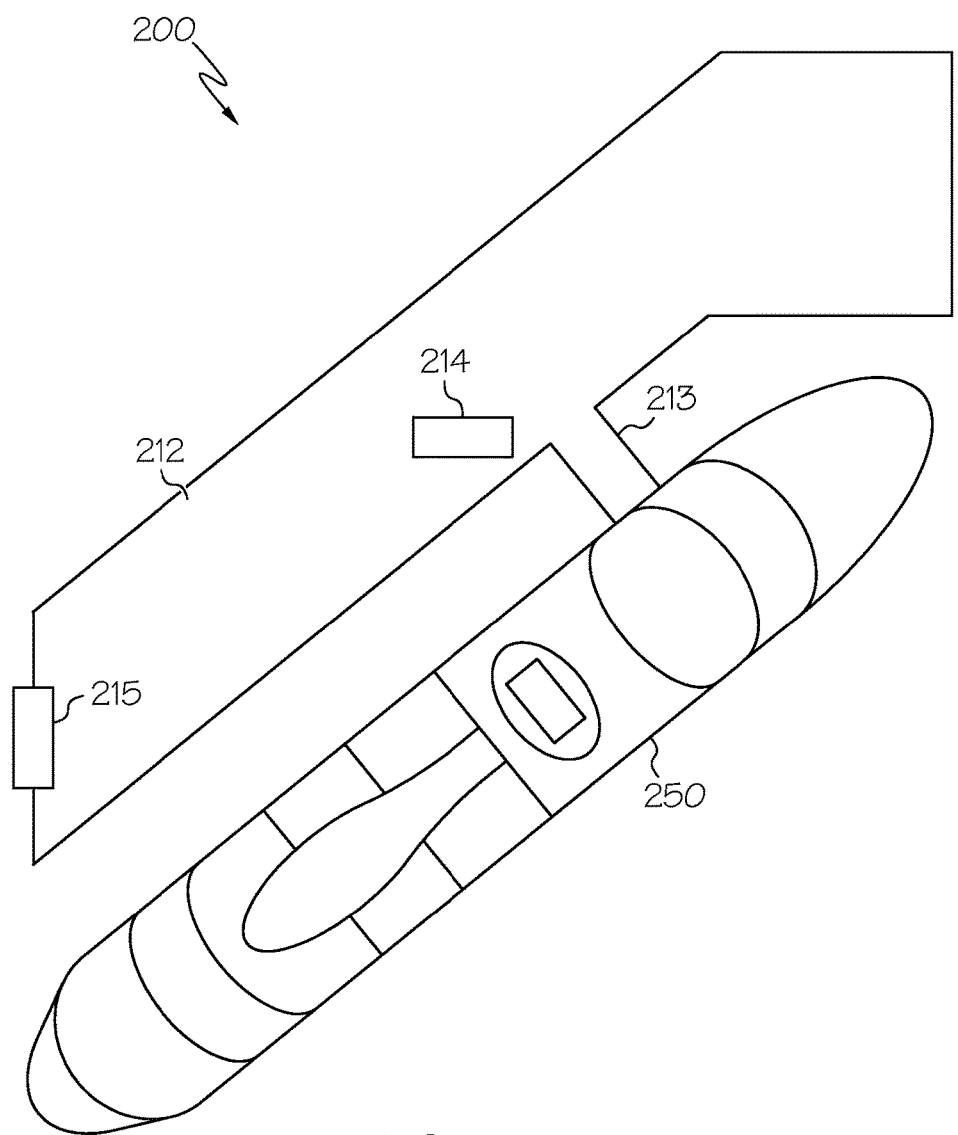
FIG. 2 is a typical security checkpoint for a cruise ship.
Figure 3:
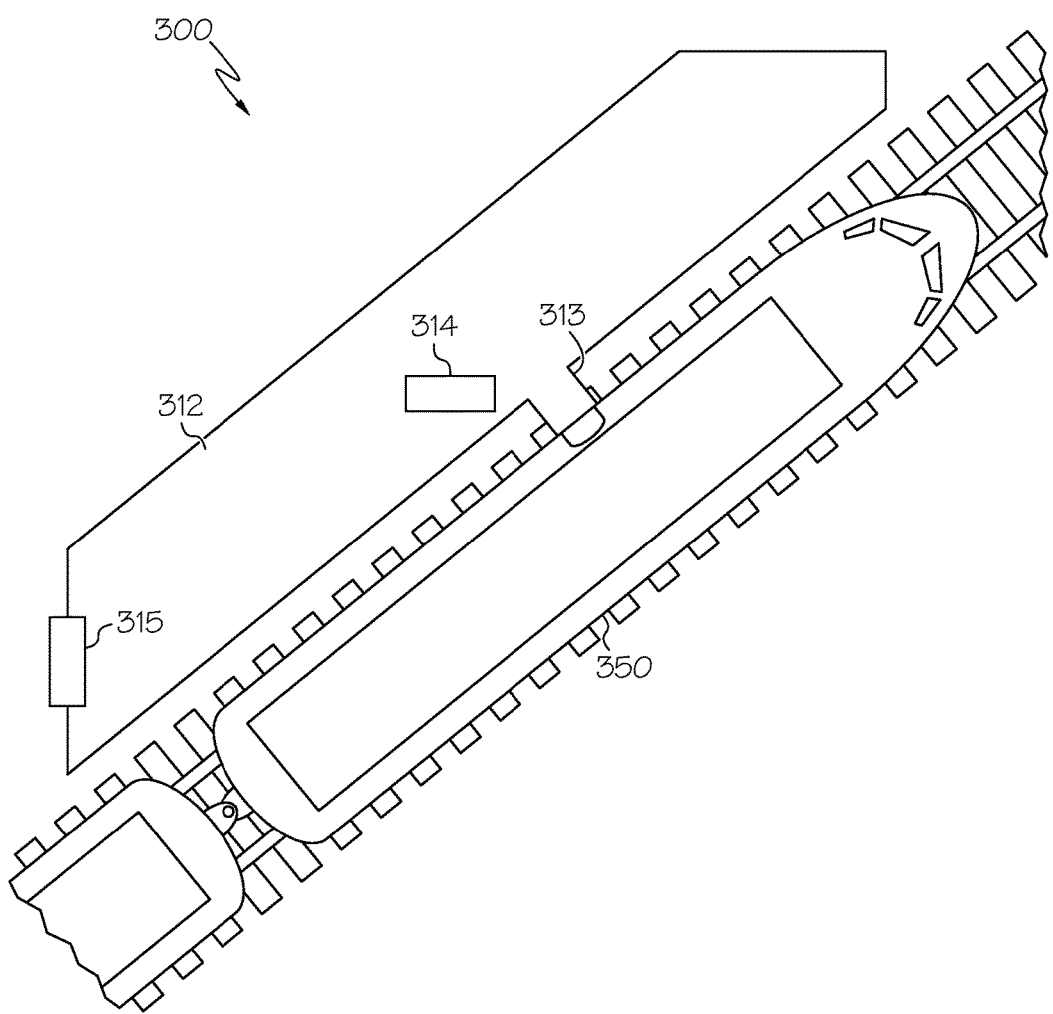
FIG. 3 is a typical security checkpoint for a train.
Figure 4:
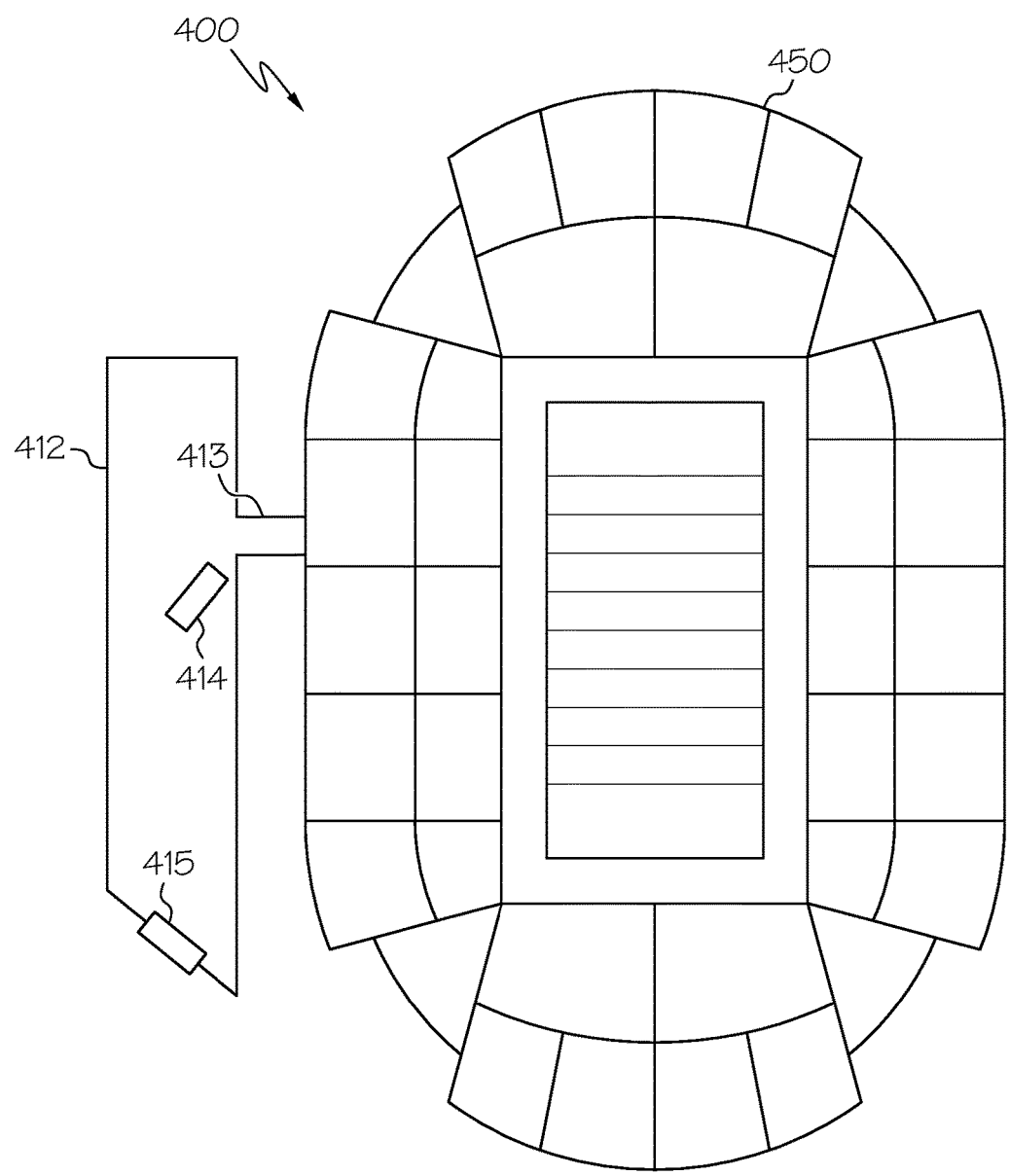
FIG. 4 is a typical security checkpoint for a stadium

FIG. 2 through FIG. 4 are examples of other security checkpoints for cruise ship, trains, and stadium respectively. More specifically, FIG. 2 is an example security checkpoint 200 for a cruise ship 250. In order to pass through a security checkpoint, travelers must show an identification, typically photo identification, or biometric scans, in order to be authenticated. Once the traveler's identify has been authenticated, the traveler physically passes through security portal 215 to enter boarding area 212. The security portal 215 may include X-ray machines and metal detectors and other systems to protect passengers, staff and ships from accidental and malicious crimes ant threats. Once inside the boarding area 212, passengers wait for the boarding of the cruise ship 250. When boarding is called, passengers present their ticket to a ticket collector in order to board the cruise ship 250 via walkway 213.

FIG. 3 is a typical security checkpoint 300 for a train 350. In order to pass through a security checkpoint, travelers must show an identification, typically photo identification, or biometric scans, in order to be authenticated. Once the traveler's identify has been authenticated, the traveler physically passes through security portal 315 to enter boarding area 312. The security portal 315 may include X-ray machines and metal detectors and other systems to protect passengers, staff and trains from accidental and malicious crimes ant threats. Once inside the boarding area 312, passengers wait to board the train 350 via walkway 313.

FIG. 4 is a typical security checkpoint 400 for a stadium 450. In order to pass through a security checkpoint, spectators many times show an identification, typically photo identification, or biometric scans, in order to be authenticated. Once the participant or spectator's identify has been authenticated, the spectator physically passes through security portal 415 to enter boarding area 412. The security portal 415 may include X-ray machines and metal detectors and other systems to protect spectators, staff and facilities from accidental and malicious crimes ant threats. Once inside the stadium area 412, card holders wait to enter the stadium 450. The spectators present their ticket to a ticket collector in order to enter the stadium 450 via walkway 413.

Figure 5:
FIG. 5 is an example of a traveler on an airplane or train after boarding with a client device.

FIG. 5 is an example of a traveler 502 sitting on a seat 504 of an airplane or train 500 after passing through a security portal 115 or 315 as shown in FIG. 1 and FIG. 3. In this example, the traveler 502 is a payment card holder. The traveler 502 is using a client device 530 to send to the payment card fraud manager an identifier associated with one or more payment cards. The card information in this example may be captured with a card reader, such as those available from Square Inc.

In one example, the payment card fraud manager also gathers information from a check-in system in which the traveler presented their ticket. Using the information from the ticket payment card combined with information received about the payment cards, the payment card fraud manager is able to adjust the payment card profiles associated with each payment card for the traveler. Continuing in this example, the payment card fraud manager updates the profile to include a destination authorization and a given time period based on information from the ticket. Note that in some examples, the ticket information may be any of: name of traveler, flight number, departure and destination locations, departure and destination times. It is important to note, that in other examples, the payment card fraud manager can prompt the user for this information without details about the ticket. This can be accomplished via email, text, interactive voice response and other technologies. Moreover, as an additional layer of protection, the network address of the venue, such as an IP address, associated with ticket for the plane, train, cruise ship, or stadium is used to further verify that the payment card holder is currently using the ticket.

An important component of the claimed invention is how the comparison of the payment card with travel information is automatically used for to manage risk by automatically changing the probability or rejection or acceptance of credit-card in a destination region. For example, when the payment card is used to make a purchase in a destination city. The fact that the payment card holder is actually on the airplane or related means of travel or in a stadium or other venue increase the odds of properly allowing transactions in a destination region. This approach decreases the traditional hassles of a payment card being denied at a remote location as a result of a payment card company considers it likely to be stolen because the destination region is not generally visited by the payment card holder and is not considered to be part of a pattern of known card use.

Moreover, the payment card fraud prevention system disclosed herein may be used to reduce illegal use of a card. For example, if a card, owned by a U.S. citizen, is being used in Paris and the card-holder from the U.S. did not register his/her card in the airplane, then the automated system disclosed herein will increase the probability of rejection in Paris. A payment card profile may be used to specify certain thresholds that are preferred to determine card rejection. For example, the payment card profile may explicit state that if the card is not registered on the plane, then it may not be used at any remote location. A trans-payment card vendor service may help manage this payment card profile for various different payment cards, which may have different criteria established by the payment card holder, payment card company, and more.

In addition, the airline may use payment card information stored during the use of the above method to facilitate onboard purchases. This could provide significant value, as a traveler's payment card swipe may be stored, and then a purchase made only with the touch of a button, or via an on screen menu. This would eliminate the time-consuming and cumbersome traditional swipe by the flight attendant his or herself. This method may also be coupled with a ground-based reservation system, such that a traveler's payment card information may be shared via an on screen menu during flight with ground transportation, hotels, and more.

In another example, advertisement is sent to the device 530 of the card holder/traveler 502 after sending payment card identifiers to the payment card fraud management system. The advertisements can be targeted for the destination, the duration of the visit, specific payment card users, and other factors. For example, if a certain number of travelers send their payment card identifiers within a specific timer period, then special coupons and advertisements are sent as an additional incentive to send their payment card identifiers to the payment card fraud management systems.

Figure 9:
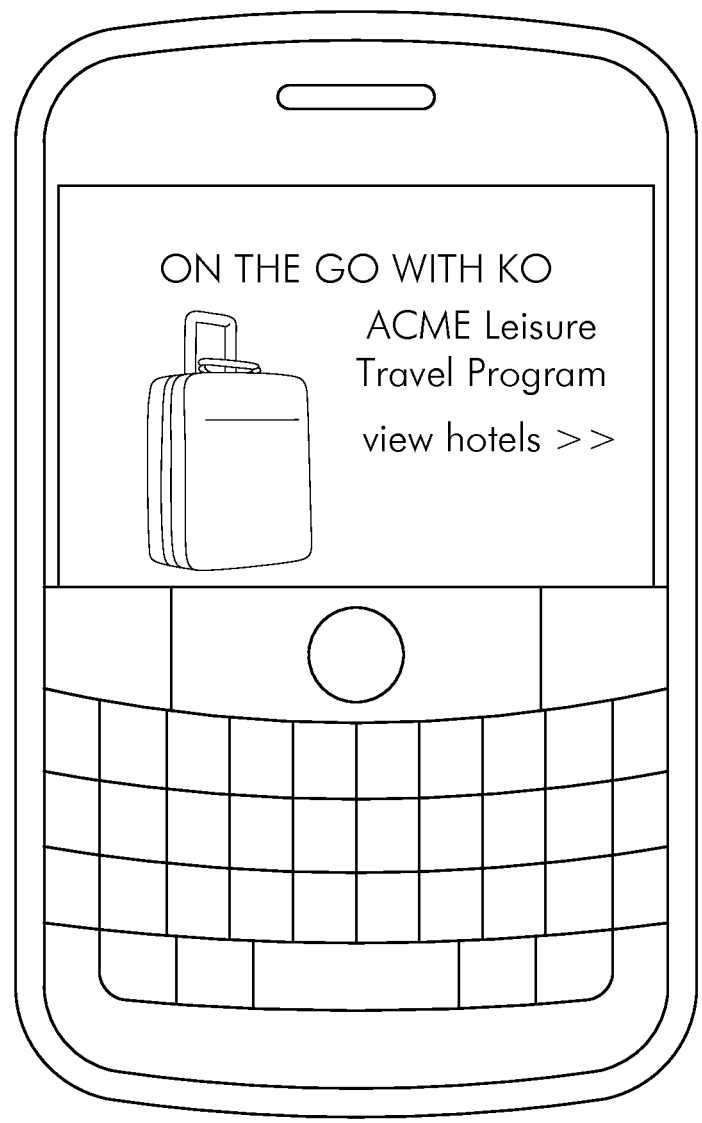
FIG. 9 is an example advertisement sent to a client device.

Note that the comparison operation performed in the airplane can be used for advertising purposes, such as the advertisement of FIG. 9 sent to the payment card holder's smartphone. Additionally, advertisements and coupons may be controlled by the number of people in an airplane sending in their payment card information to the payment card fraud manager within a threshold time T. For example, perhaps a company in a destination region may offer a greater discount if one hundred people send in their credit card information as compared to a situation in which only three people send in their credit card information. The nature of the advertisement may depend on other information gains at the time of comparison, such as: name of traveler, flight number, departure and destination location, departure time, and destination time. Also of potential use is the traveler information that may include codes associated with the ticket, such as: 1) first class, business class, economy class, 2) airline abbreviation (e.g. American Airlines), 3) child fare, one way, stopover, student, international, etc. In addition, because airline tickets include several codes the claimed invention may afford for automatic market analysis based on these codes e.g. travelers in groups, airline selection, ticketing code, first class, business class, and more.

Payment Card Fraud Manager

Figure 6:
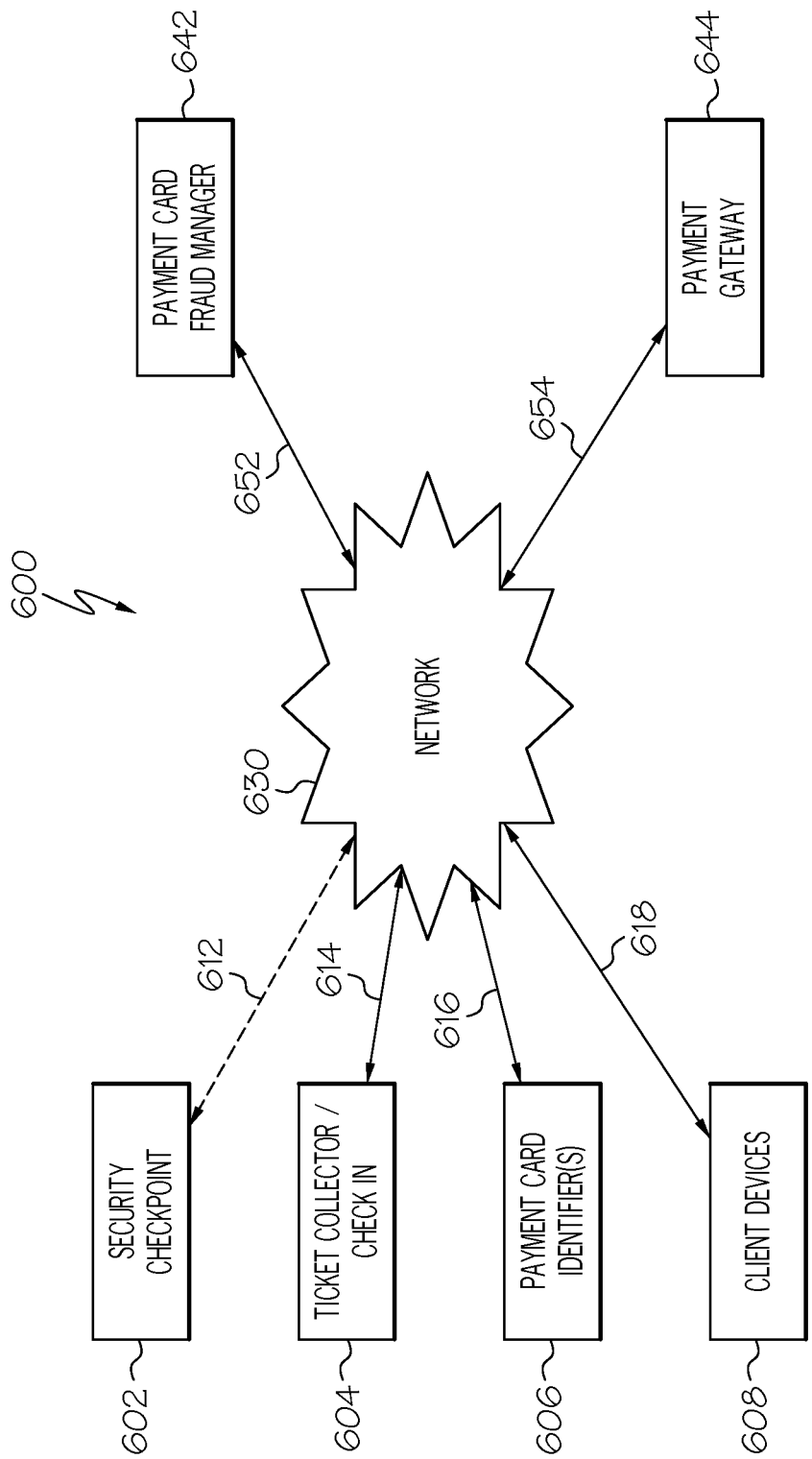
FIG. 6 is an example functional block diagram of the major components of the payment card fraud manager.

FIG. 6 is an example functional block diagram of the major components of the payment card fraud manager 600. Shown is a payment card fraud manager computer 642 that may be used to carry out the management of payment card fraud. The computer 642 is connected to network 630, e.g., the Internet or a local area network 630. Also shown communicatively coupled to the network 630 is a security checkpoint system 602. This is shown as an optional connection 612 by the dashed/broken line. This connection 612 is optional in the circumstances in which agencies, such as government agencies, managing security checkpoints do not share information with third party systems, such as the payment card fraud manager 642. A ticket collector/check-in point system 604 is communicatively coupled to network 630 via communication link 614 and payment card identifier system 606 via communication link 616. A client device 608, such as a smartphone, tablet, laptop computer is also shown coupled to network 630. The operating environments on the client devices may be Microsoft Windows, Apple iOS, Google Android, Linux, or other operating systems.

The systems 602, 604, 606, 642, 644 and client device 608 may be directly or indirectly coupled to network 630. For example, systems 602, 604, 606, 642, 644 and client device 608 could be directly coupled to network 630 via a hardwired network connection or wirelessly coupled to network 630 via wireless communication channel. Wireless communication can be an IEEE 802.11a, 802.11b, 802.11g, Wi-Fi, and/or more.

Also shown coupled to the network 630 via link 654 is a payment gateway system 644 that authorizes credit card payments for e-businesses, online retailers, bricks and clicks, or traditional brick and mortar. Although system payment card fraud manager 642 and payment gateway 644 are shown as separate systems, it is within the true scope of the presently claimed invention for these to be combined into one system.

Each system 602, 604, 606, 642, 654 may include, but are not limited to: a personal computer, a server computer, a series of server computers, a mini computer, and a mainframe computer. The system 602, 604, 606, 642, 654 may be a single server or a series of servers running a network operating system, examples of which may include but are not limited to Microsoft Windows Server or Linux. System 602, 604, 606, 642, 654 may execute a web server application, examples of which may include but are not limited to IBM Websphere or Apache Webserver™, that allows for HTTP (i.e., HyperText Transfer Protocol) access to other systems via network 630. Moreover, network 630 may be connected to one or more secondary networks e.g., network 630, examples of which may include but are not limited to: a local area network; a wide area network; or an intranet, for example.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Payment Card Profile

FIG. 7 is an example a payment card profile 700. As shown a column with a payment card identifier 702 uniquely identifies each payment card. The payment card user/traveler is identified in column 704 along with a destination region 706, column 708 with a timer period and column 710 is a probability. Column 710 is a travel-information record for the purpose of automatically changing the probability of rejection or acceptance of payment card in a destination region. That is when the payment card is used to make a purchase in a destination region. In all these examples, the payment cards are set to "H" for high probability that the authenticated traveler is going to the destination region. For example in rows 712 and 714 CARD 1 and CARD 2 in which the payment card identifier has been received for TRAVELER A. The ticket is for a CITY M and the time period is 48 hours and the probability set to "H" for high that the authenticated traveler is going to the CITY M. In rows 722, 724, and 726 CARD 1, CARD 2, and CARD 3 in which the payment card identifier has been received for TRAVELER B. The ticket is for a COUNTRY C and the time period is 7 days and the probability set to "H" for high that the traveler is going to COUNTRY C. For example in rows 732 CARD 1 in which the payment card identifier has been received for TRAVELER C. The ticket is for a VENUE and the time period is 4 hours and the probability set to "H" for high that the authenticated traveler going to COUNTRY C. In rows 742, 744, CARD 1 and CARD 2 in which the payment card identifier has been received for TRAVELER D. The ticket is for a CITY-PORT OF CALL and the time period is 8 hours and the probability set to "H" for high that the authenticated traveler going to CITY-PORT OF CALL. As can be seen, each traveler has one or more payment card identifiers, along with destination region and a time period. Other information, such as information from a ticket such as: 1) first class, business, class, economy class; 2) airline abbreviation (e.g. American Airlines); 3) child fare, one way, stopover, student, international, and other codes found here at online URL (http://www.air-ticket.us/info/airline-ticket-abbreviation.php). Note in row 746, there is a CARD 3 associated with TRAVELER C which has not been registered for CITY-PORT OF CALL. However, since the user did not send the identifier for this CARD 3, it is set to a low probability "L" of acceptance for a transaction in the destination region.

Flow Chart

Figure 8:
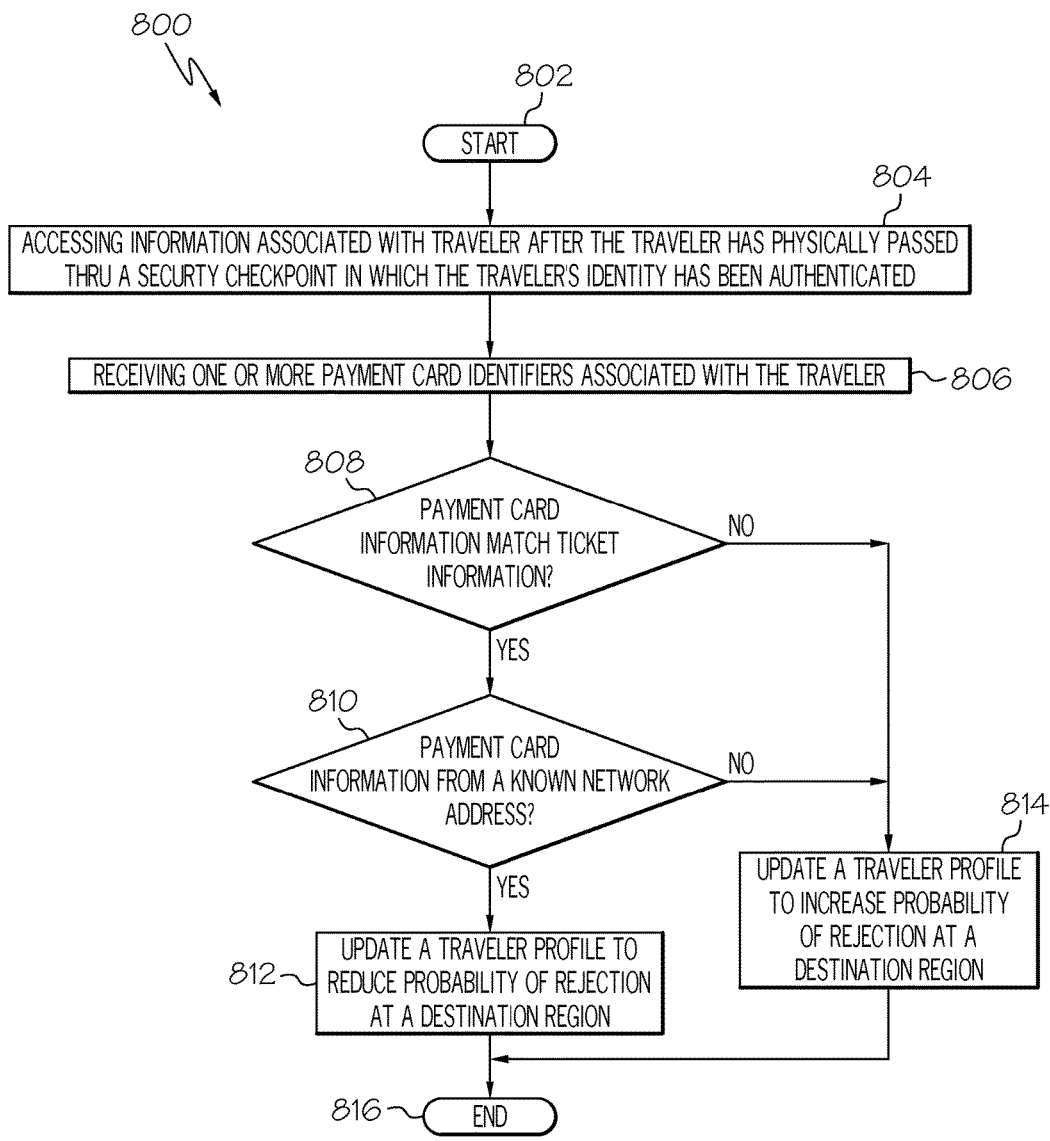
FIG. 8 is a flow chart of updating payment card profiles by the payment card fraud manager.

FIG. 8 is a flow chart of is a flow chart 800 of updating payment card profiles 700 by the payment card fraud manager 642. The process begins in step 802 and immediately proceeds to step 804 in which information associated with traveler after the traveler has physically passed through a security checkpoint in which the traveler's identity has been authenticated is accessed. Next, in step 806, one or more payment card identifiers associated with the traveler are received. As enhanced security, an optional test is made to see if the payment card information matches the ticket in step 808. In the event the payment card information is different than the ticket information the process continues to step 814, in which the probability of rejection in the traveler's profile is increased. This increase can be a scale such as 1-100 or just "High" and "Low" or some combination thereof. The process ends in step 816. Otherwise, if the payment card information matches the ticket information in step 808, the process continues to step 810. Another optional enhanced security check can be made to determine if the payment card information is from a known network address associated with the venue i.e. airline, cruise ship, train, bus, stadium, the card holder's telephone or client device identifier, etc. In the event the information is from a known network address, the process continues to step 812 in which the travel profile 700 is updated to reduce the probability of rejection at the destination region and the process ends in step 816. Stated differently, the payment card profile 700 for the card holder is set to low probability of rejection when the payment card is used to make a purchase in a destination region.

Information Processing System

Figure 10:
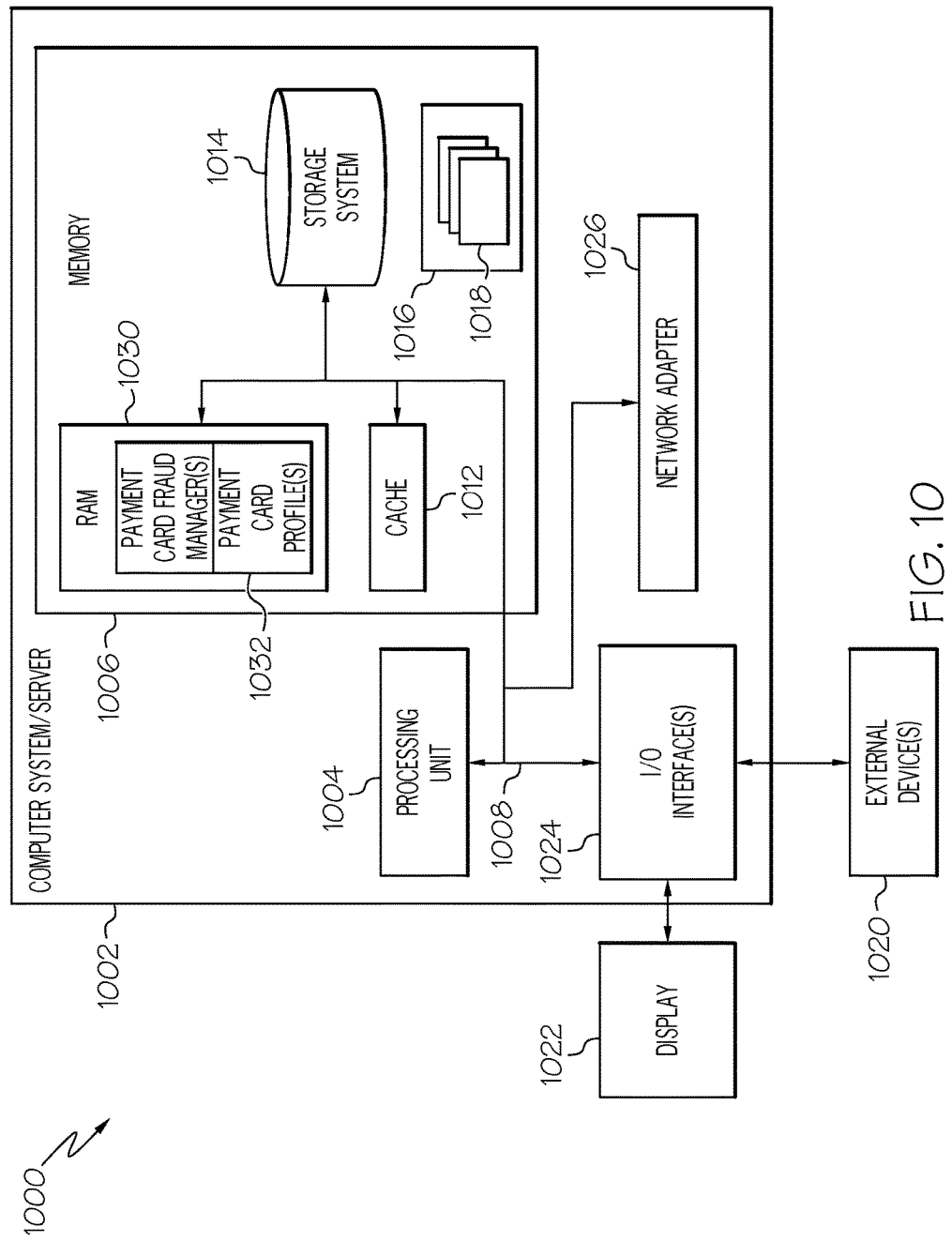
FIG. 10 is a block diagram illustrating one example of a client or server information processing system.

Referring now to FIG. 10, this figure is a block diagram 1000 illustrating an information processing system that can be utilized in embodiments of the present invention for payment card fraud manager 642 or any of the systems 602, 604, 606, 644 and client device 608. The information processing system 1002 is based upon a suitably configured processing system configured to implement one or more embodiments of the presently claimed invention. Any suitably configured processing system can be used as the information processing system 1002 in embodiments of the present invention. The components of the information processing system 1002 can include, but are not limited to, one or more processors or processing units 1004, a system memory 1006, and a bus 1008 that couples various system components including the system memory 1006 to the processor 1004.

The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 1002 can further include other removable/non-removable, volatile/non-volatile computer system storage media. By way of example only, a storage system 1014 can be provided for reading from and writing to a non-remov6able or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1008 by one or more data media interfaces. The memory 1006 can include at least one program product having a set of program modules that are configured to carry out the functions of an embodiment of the present invention.

Program/utility 1016, having a set of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of embodiments of the present invention.

The information processing system 1002 can also communicate with one or more external devices 1020 such as a keyboard, a pointing device, a display 1022, etc.; one or more devices that enable a user to interact with the information processing system 1002; and/or any devices (e.g., network card, modem, etc.) that enable computer system/server 1002 to communicate with one or more other computing devices. Such communication can occur via I/O interfaces 1024. Still yet, the information processing system 1002 can communicate with one or more networks such as a local area network (LAN), a general wide area network (WAN), and/or a public network (e.g., the Internet) via network adapter 1026. As depicted, the network adapter 1026 communicates with the other components of information processing system 1002 via the bus 1008. Other hardware and/or software components can also be used in conjunction with the information processing system 1002. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for managing payment card transactions, the method comprising:
   using at least one server processor for:
   using at least one biometric sensor to perform biometric identification of a card holder prior to allowing the card holder to physically pass through at least one security checkpoint;
   accessing, by a payment card company, information associated with the card holder after the card holder has physically passed through the at least one security checkpoint in which the card holder's identity has been authenticated using biometric identification;
   extracting at least one destination region from a ticket associated with the card holder;
   only after the card holder has physically passed through the at least one security checkpoint, receiving from the card holder using a client processor-based device, at least one payment card identifier associated with the card holder through one or more of a magnetic strip payment card reader, a text message, an optical recognition of a picture of a payment card, and a near field wireless communication with a smart-chip embedded in a credit card and while on one of an airplane, a bus, a train, or a ship and prior to reaching a ticketed destination; and
   updating, by the payment card company, a payment card profile associated with the payment card by authorizing use of the payment card within at least one or more of the destination region and a time period, and the updating the payment card profile includes reducing a probability of rejection of the payment card in at least one destination region when the payment card is used to make a purchase based upon receiving the payment card identifier using the client processor-based device from a ticket venue network address defined as an identifier for a node or a network interface of a telecommunications network associated with the ticket, wherein the ticket venue network address is located after the card holder has physically passed through the at least one security checkpoint, and
   increasing the probability of rejection of the payment card in response to failing to receiving the payment card identifier using the client processor-based device, from the ticket venue network address defined as the identifier for the node or the network interface of the telecommunications network associated with the ticket.

2. The computer-implemented method of claim 1, wherein the security checkpoint is at least one of an aviation security checkpoint, a bus security checkpoint, a train security checkpoint, a ship security checkpoint, a stadium security checkpoint, a border crossing security checkpoint, or a combination thereof.

3. The computer-implemented method of claim 1, wherein the payment card is at least one of a credit card, a cash card, a pre-paid card, a secured card, a gift card, an automatic teller card, a bank card, a check card, or a combination thereof.

4. The computer-implemented method of claim 1, wherein the updating the payment card profile associated with the payment card includes changing a probability of rejection of the payment card in at least one destination region when the payment card is used to make a purchase.

5. The computer-implemented method of claim 4, wherein prior to updating the payment card profile, verifying payment card identifier matches information from a ticket associated with the card holder.

6. The computer-implemented method of claim 1, wherein the changing the probability of rejection is directly related to receiving the payment card identifier within a settable period of time.

7. The computer-implemented method of claim 1, further comprising:
   sending at least one advertisement to a client device of the card holder based on a destination region, a credit card identifier, or a combination there.

8. A payment card fraud management system comprising:
   a memory;
   a processor communicatively coupled to the memory, where the processor is configured to perform
   using at least one biometric sensor to perform biometric identification of a card holder prior to allowing the card holder to physically pass through at least one security checkpoint;
   accessing, by a payment card company, information associated with the card holder after the card holder has physically passed through the at least one security checkpoint in which the card holder's identity has been authenticated using biometric identification;
   extracting at least one destination region from a ticket associated with the card holder;

receiving at least one payment card identifier associated with the card holder using a client processor-based device, only after the card holder has physically passed through the at least one security checkpoint and while on one of an airplane, a bus, a train, or a ship and prior to reaching a ticketed destination; and updating, by the payment card company, a payment card profile associated with the payment card by authorizing use of the payment card within at least one or more of the destination region and a time period, and the updating the payment card profile includes changing a probability of rejection of the payment card in at least one destination region when the payment card is used to make a purchase based upon receiving the payment card identifier using the client processor-based device from a ticket venue network address defined as an identifier for a node or a network interface of a telecommunications network associated with the ticket, wherein the ticket venue network address is located after the card holder has physically passed through the at least one security checkpoint; and increasing the probability of rejection of the payment card in response to failing to receiving the payment card identifier using the client processor-based device from the ticket venue network address defined as the identifier for the node or the network interface of the telecommunications network associated with the ticket.

9. The payment card fraud management system of claim 8, wherein the security checkpoint is at least one of an aviation security checkpoint, a bus security checkpoint, a train security checkpoint, a ship security checkpoint, a stadium security checkpoint, a border crossing security checkpoint, or a combination thereof.

10. The payment card fraud management system of claim 8, wherein the payment card is at least one of a credit card, a cash card, a pre-paid card, a secured card, a gift card, an automatic teller card, a bank card, a check card, or a combination thereof.

11. The payment card fraud management system of claim 8, wherein the updating the payment card profile associated with the payment card includes changing a probability of rejection of the payment card in at least one destination region when the payment card is used to make a purchase.

12. The payment card fraud management system of claim 11, wherein prior to updating the payment card profile, verifying payment card identifier with information from a ticket associated with the card holder.

13. The payment card fraud management system of claim 8, wherein the changing the probability of rejection is directly related to receiving the payment card identifier within a settable period of time.

14. A non-transitory computer program product for managing payment card transactions, the computer program product comprising:

a computer readable storage medium having computer readable program code embodied therewith, the computer readable program code configured to:

using at least one biometric sensor to perform biometric identification of a card holder prior to allowing the card holder to physically pass through at least one security checkpoint;

accessing, by a payment card company, information associated with the card holder after the card holder has physically passed through the at least one security checkpoint in which the card holder's identity has been authenticated using biometric identification;

extracting at least one destination region from a ticket associated with the card holder;

receiving at least one payment card identifier associated with the card holder, only after the card holder has physically passed through the at least one security checkpoint and while on one of an airplane, a bus, a train, or a ship and prior to reaching a ticketed destination; and updating, by the payment card company, a payment card profile associated with the payment card by authorizing use of the payment card within at least one or more of the destination region and a time period, and the updating the payment card profile includes changing a probability of rejection of the payment card in at least one destination region when the payment card is used to make a purchase based upon receiving the payment card identifier using a client processor-based device from a ticket venue network address defined as an identifier for a node or a network interface of a telecommunications network associated with the ticket, wherein the ticket venue network address is located after the card holder has physically passed through the at least one security checkpoint; and increasing the probability of rejection of the payment card in response to failing to receiving the payment card identifier using a client processor-based device from the ticket venue network address defined as the identifier for the node or the network interface of the telecommunications network associated with the ticket.

15. The computer-implemented method of claim 5, wherein the updating the payment card profile associated with the payment card includes authorizing use of the payment card in a destination region only with destination information from the ticket.

16. The payment card fraud management system of claim 12, wherein the updating the payment card profile associated with the payment card includes authorizing use of the payment card in a destination region only with destination information from the ticket.

17. The non-transitory computer program product for managing payment card transactions of claim 14, wherein the updating the payment card profile associated with the payment card includes authorizing use of the payment card in a destination region only with destination information from the ticket.

* * * * *